Nov. 20, 1934.     G. D. BISHOP     1,981,772
FRUIT GUARD
Filed July 2, 1932
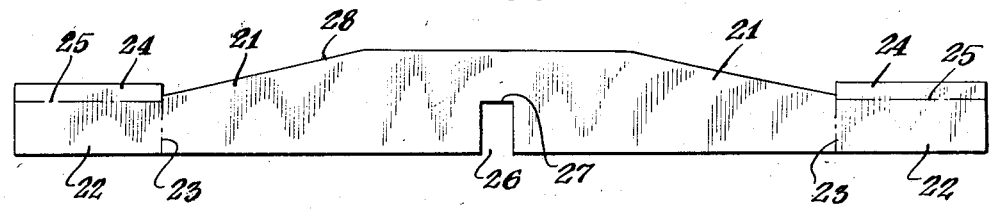
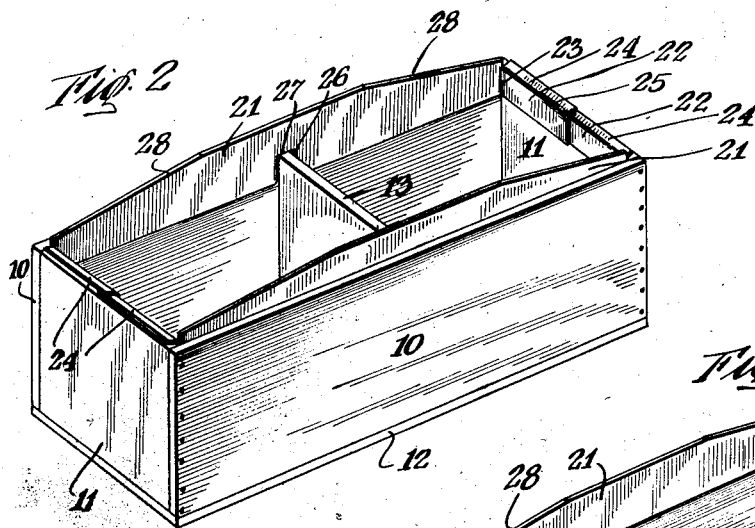
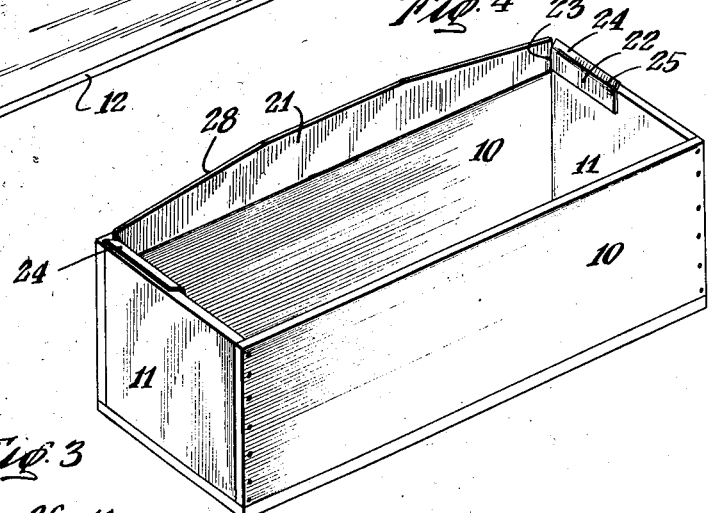
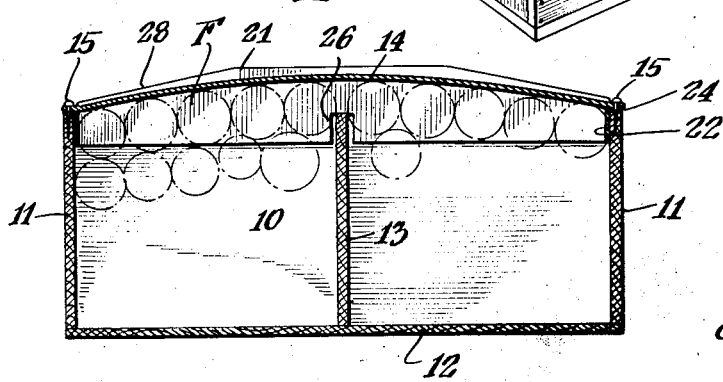
INVENTOR
George D. Bishop
BY
Austin & Dix
ATTORNEYS Patented Nov. 20, 1934

1,981,772

UNITED STATES PATENT OFFICE 1,981,772

FRUIT GUARD

George D. Bishop, Sanford, Fla.

Application July 2, 1932, Serial No. 620,571

6 Claims. (Cl. 217—3)

This invention relates to the packing of fruits and vegetables and more particularly to a fruit guard which shields and protects the top layer of fruit against injury during packing and shipping.

In packing citrus fruits, such as oranges and lemons, the top layer is commonly allowed to extend a substantial distance above the sides of the box or crate. When the cover slats are applied to the box, pressure is exerted thereon sufficient to force the ends of the slats down against the ends of the box, thereby pushing the fruit in the top layer downwardly, and causing the fruit adjacent the ends and sides of the box to slide against the inside of the box. This frequently results in bruising the skin of the fruit, which causes rapid decomposition of the top layer. The fruit guard herein disclosed is an improvement over the fruit guard shown and disclosed in my prior Patent, No. 1,799,497 and dated April 7, 1931.

In accordance with the principles of this invention, a pair of fruit guards are provided which seat and rest on the top edge of the crate or fruit box. Each of the fruit guards comprises generally a side wall portion or center section which is positioned along a side wall of the box and extends the full length thereof, and end wall portions which extend from the side wall portions and seat along the ends of the box. The end wall portions are preferably provided with an outwardly overhanging lip, which rests upon the top edge of the end wall, and thus supports the guard in position. The side wall portion of the guard extends a substantial distance above the top edge of the box and may be arcuate in shape so as to approximately conform to the bulged contour of the box cover when the box is packed with fruit. If the box is provided with a transverse center wall, a notch is cut in the side wall section of the guard so that the notch portion, which fits over the center wall, will further support the guard.

Each fruit box is equipped with a pair of guards, one extending along each side wall of the box with the end wall portion of the guards overlapping or abutting one another. The fruit guard herein disclosed fully protects the top layer of fruit along the entire side of the box. The top layer of fruit is also fully protected along the end walls of the box and can only contact the smooth paperboard material of the guard. The fruit guard herein presented is very economical to make and can be very quickly applied to the box. The guard will come to rest in proper position upon the box by merely dropping the same thereon without further adjustment to locate the same in position. This is of considerable advantage in the packaging of the fruit.

It is an object of my invention to provide a fruit guard which is self-adjustable in position and which is so designed as to fully protect the top layer of fruit along the sides and ends of the box.

Another object of my invention is to provide a pair of complementary fruit guards adapted to be positioned to surround the top edge of a fruit box, which guards can be quickly and easily applied without special attention, which are self-adjustable in position and will remain in proper position at all times during packing and shipment, and which fully and completely protect the top layer of fruit at all points.

Another object of my invention is to provide a fruit guard which can be very economically made with a minimum of material and labor, which efficiently and adequately protects the top layer of fruit against injury, and which can be easily and quickly applied without special attention or adjustment thereof.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which:

Fig. 1 is a side view of a fruit guard as it appears when fully extended;

Fig. 2 is a perspective view of a packing box having two compartments, with a pair of complementary fruit guards applied thereto;

Fig. 3 is a vertical longitudinal cross sectional view through a two compartment box and associated fruit guard, the box being fully packed and covered with slats; and Fig. 4 is a perspective view of a packing box without a center wall, a fruit guard of slightly modified construction being shown applied thereto.

Like reference characters denote like parts in the several figures of the drawing.

Referring more particularly to Fig. 2 of the drawing, there is shown a two compartment box comprising side walls 10, end walls 11, a bottom wall 12 and a transverse center wall 13. A pair of complementary fruit guards are shown applied thereto which may be of substantially the same shape and construction. Each guard comprises generally a side wall portion 21 of sufficient length to extend from one end wall of the box to the other. An end wall portion 22 is provided at each end of the side wall portion 21 and are hinged thereto along the score lines 23. Each of the end wall portions 22 are provided with a lip or flange 24, which is defined therefrom by the score lines 25. The side wall portion 21 is of sufficient height to extend a substantial distance above the top edge of the box, and the top edge 28 thereof may be of general arcuate shape so as to substantially conform to the bulged contour of the box cover slats 14, shown more particularly in Fig. 3.

If the fruit box or crate is provided with a center partition 13, it is preferable to cut a notch 26 in the side wall portion of the guard so that when the same is placed in position on the crate the notch will straddle the center wall 13, with the top edge 27 of the notch 26 resting on the top edge of the center wall, as clearly shown in Figs. 2 and 3. The fruit guard is thus supported at the center thereof, as well as at the ends. If the box is without a center wall, as shown in Fig. 4, the guard need not be provided with a notch 26.

The fruit guard may be applied to the box just before any fruit F has been placed in the box, or when the box is partially filled with fruit, or when completely filled with fruit. In applying the fruit guards, the lips 24 are bent outwardly and each guard is dropped in position. The lip portions 24 will drop over the top edge of the end walls of the box and the notch 26 will straddle and seat over the center wall 13 of the box automatically and without manual adjustment. Little or no time is thus required to apply the fruit guards to the box during the packing operation. When the guards have been applied, they lock themselves to the box and cannot get out of adjustment either during packing or during shipment. The end wall portions 22 of the guard may be of such length as to overlap one another when positioned in the box, or of such length as to arrange themselves in abutting position, whichever is found the most desirable. After the fruit has been packed within the box, the cover slats 14 are secured to the end walls 11 of the box by means of nails 15 or other securing means. The side wall portion 21 of the guard, as shown more particularly in Fig. 3, extends a considerable distance above the top edge of the box and the top edge 28 thereof may be cut to general arcuate form so as to approximately conform to the bulged contour of the slats 14 when nailed into place.

The fruit guards above disclosed can be made on a cutting and scoring machine at a single operation by merely running the paper sheet material therethrough. The guards are of such shape that very little waste of material occurs, and the guard can generally be very economically made and sold at low cost. The fruit guards, furthermore, may be applied to the box without giving any special attention to the adjustment thereof, and when the guards have been put in place, no amount of disturbance during packing or shipping will move the guards out of their proper position.

It is understood that the fruit guard and packing box combination herein disclosed may be used in connection with the packing of many different kinds of fruits and vegetables and other materials which are liable to become injured during packing and transit. The term "fruit guard" as used in the specification and claims should therefore be so interpreted.

While certain novel features of the invention have been disclosed and are pointed out in the annexed claims, it will be understood that various omissions, substitutions and changes may be made by those skilled in the art without departing from the spirit of the invention.

What is claimed is:

1. A fruit guard comprising a band of paperboard having a side wall portion adapted to engage a side wall of a fruit box the full length thereof, and an end wall portion at each end of said side wall portion adapted to engage the respective box end walls, said side wall portion having a notch in the mid section thereof which seats over the transverse center wall of the box, said end walls each having an overhanging lip which rests on the top edge of the box end wall and supports the ends of said guard in operative position.

2. A fruit guard comprising a band of paperboard having a side wall portion adapted to engage a side wall of a fruit box the full length thereof, and an end wall portion at each end of said side wall hinged to the side wall and having one end free, said end wall portion being adapted to abut the respective box end walls, said side wall portion having an arcuate top edge shaped to substantially conform to the bulge contour of the box cover, said end wall portions each having a lip resting on the top edge of the box end wall and supporting said guard in operative position.

3. A fruit guard comprising a band of paperboard having a side wall portion adapted to engage a side wall of a fruit box the full length thereof, and an end wall portion at each end of said side wall portion adapted to engage the respective box end walls, said side wall portion having a notch in the mid section thereof which seats over the transverse center wall of the box, said end walls each having an overhanging lip which rests on the top edge of the box end wall and supports said guard in operative position, said side wall portion having an arcuate top edge shaped to substantially conform to the bulge contour of the box cover.

4. A fruit box having side and end walls and a transverse center wall in combination with a pair of fruit guards mounted within said box adjacent the top row of fruit, each of said guards comprising a band of paperboard having a side wall portion which extends the full length of a side wall of the box, and a pair of end wall portions which extend part way along the end walls of the box, each of said end wall portions having an overhanging lip which rests upon the top edge of a box end wall and supports the guards in position, each of said side wall portions having a notch in the mid section thereof which seats over the transverse center wall of the box.

5. A fruit box having side and end walls and a transverse center wall in combination with a pair of fruit guards mounted within said box adjacent the top row of fruit, each of said guards comprising a band of paperboard having a side wall portion which extends the full length of the side wall of the box, and a pair of end wall portions which extend part way along the end walls of the box, each of said end wall portions having an overhanging lip which rests upon the top edge of a box end wall and supports the guards in position, each of said side wall portions having a notch in the mid section thereof which seats over the transverse center wall of the box, said side wall portions also extending a substantial distance above the top edge of the box and having generally an arcuate top edge contour which substantially conforms to the bulged contour of the box cover.

6. Fruit guard for bulge-packed crates of the type having a middle partition comprising a sheet member adapted to fit within the open top of a crate having a body portion extending above the sides of the crate, and end portions foldable relative to the body portion, the end portions having flanges adapted to rest on the ends of the crate and the body portion being provided with an indentation adapted to bridge the middle partition with clearance, so that said body portion spans the length of the crate without intermediate support.

GEORGE D. BISHOP.